United States Patent [19]
Papsdorf

[11] 3,895,426
[45] July 22, 1975

[54] WIRE STRIPPING METHOD AND DEVICE
[75] Inventor: John W. Papsdorf, Lake Orion, Mich.
[73] Assignee: Cardinal of Adrian, Inc., Dryden, Mich.
[22] Filed: Mar. 22, 1974
[21] Appl. No.: 453,787

[52] U.S. Cl. ............... 29/427; 29/203 R; 81/9.51; 83/24
[51] Int. Cl.² .......................................... B23P 19/02
[58] Field of Search .......... 29/426, 427, 203 R, 628; 81/9.51, 9.5 R, 9.5 A; 83/23, 24, 25, 27, 39, 42, 51; 30/90.6

[56] References Cited
UNITED STATES PATENTS

| | | | |
|---|---|---|---|
| 2,395,374 | 2/1946 | Lembitz et al. | 81/9.51 |
| 3,151,510 | 10/1964 | Bunker et al. | 30/90.6 |
| 3,212,369 | 10/1965 | Way | 30/90.6 X |
| 3,364,801 | 1/1968 | Johnston | 81/9.51 |
| 3,484,936 | 12/1969 | Schwalm et al. | 29/427 |
| 3,590,666 | 7/1971 | Langer | 81/9.51 |
| 3,604,291 | 9/1971 | Weidner | 81/9.51 |
| 3,706,241 | 12/1972 | Balmer et al. | 81/9.51 |
| 3,786,697 | 1/1974 | Abarotin | 81/9.51 |
| 3,817,127 | 6/1974 | Soeller | 81/9.51 |
| 3,832,767 | 9/1974 | Petree | 29/427 |

Primary Examiner—C. W. Lanham
Assistant Examiner—James R. Duzan
Attorney, Agent, or Firm—Cullen, Settle, Sloman & Cantor

[57] ABSTRACT

A punched tape-controlled device for automatically feeding, cutting to predetermined length, stripping the insulation and severing and loosening the jacket of three-wire jacketed cable. Pneumatically controlled opposed pairs of cutting blades simultaneously sever the cable at a first location, sever the jacket only at second and third points about 5½ inches on each side of the first location and sever the insulation at fourth and fifth points about ½ inch on each side of the first location. The cable portions lying on the opposite sides of the second and third points from the first point are then firmly gripped by a pneumatically and externally pressurized tube surrounding such cable portions and are each indexed away from the first point while the severed jacket portions are held in place by the extended cutting blades, thereby breaking loose and partially stripping the severed jacket portions.

15 Claims, 9 Drawing Figures

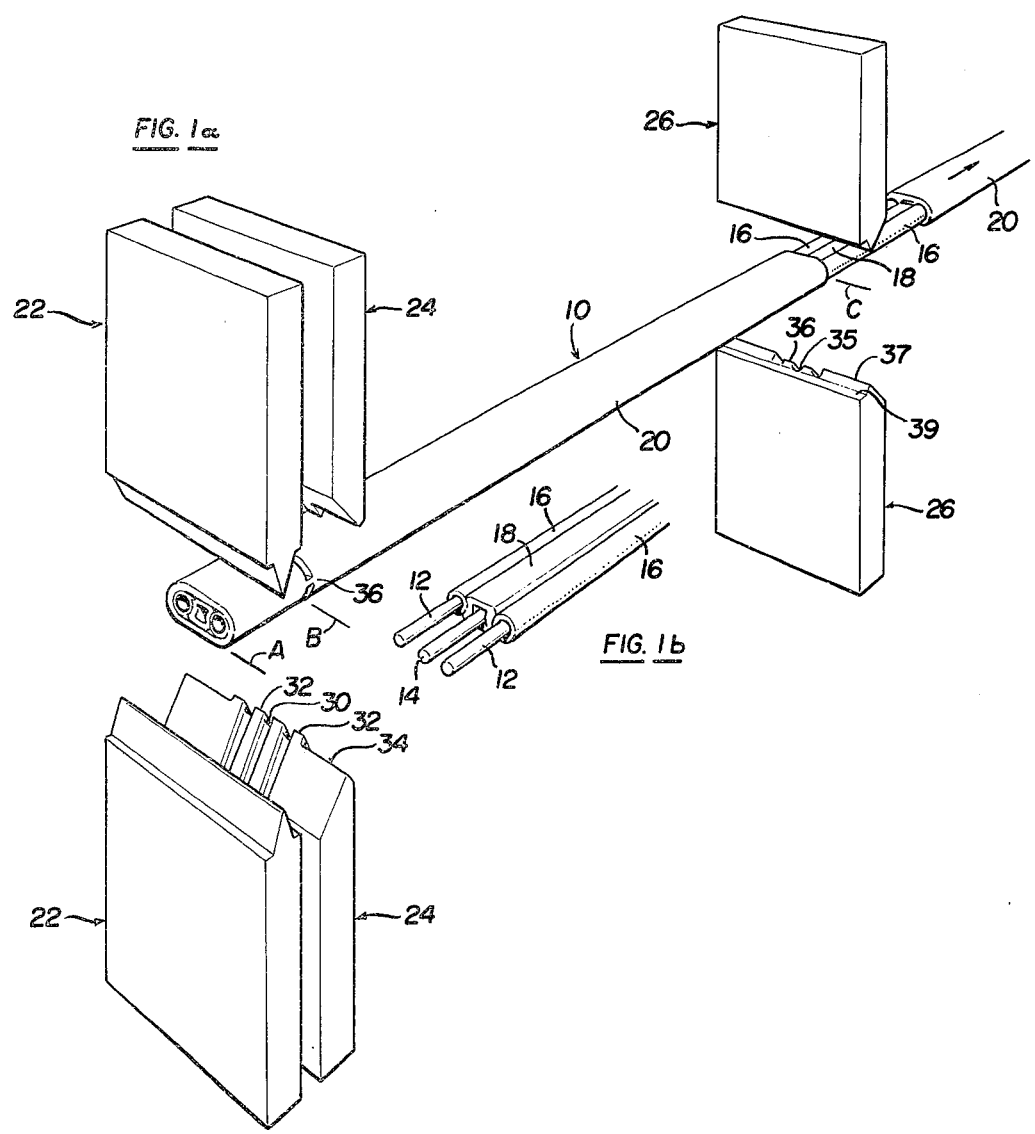
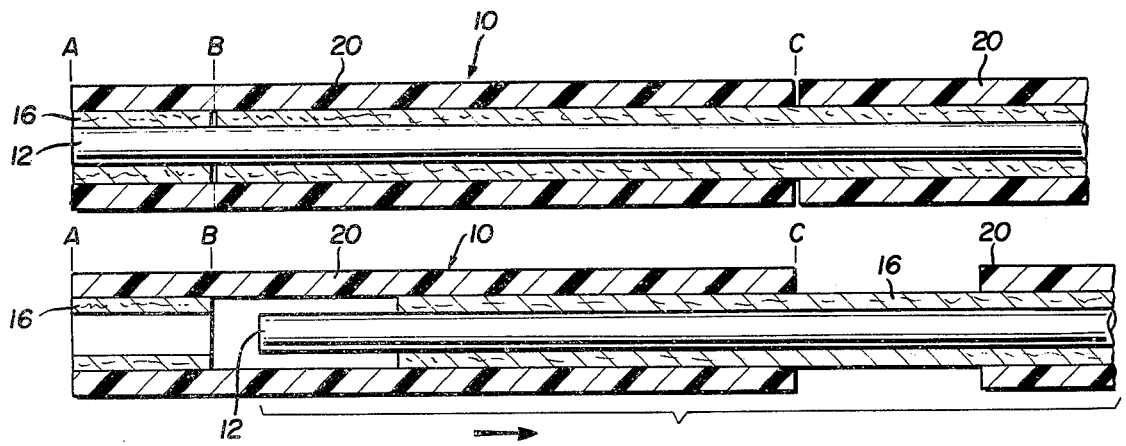

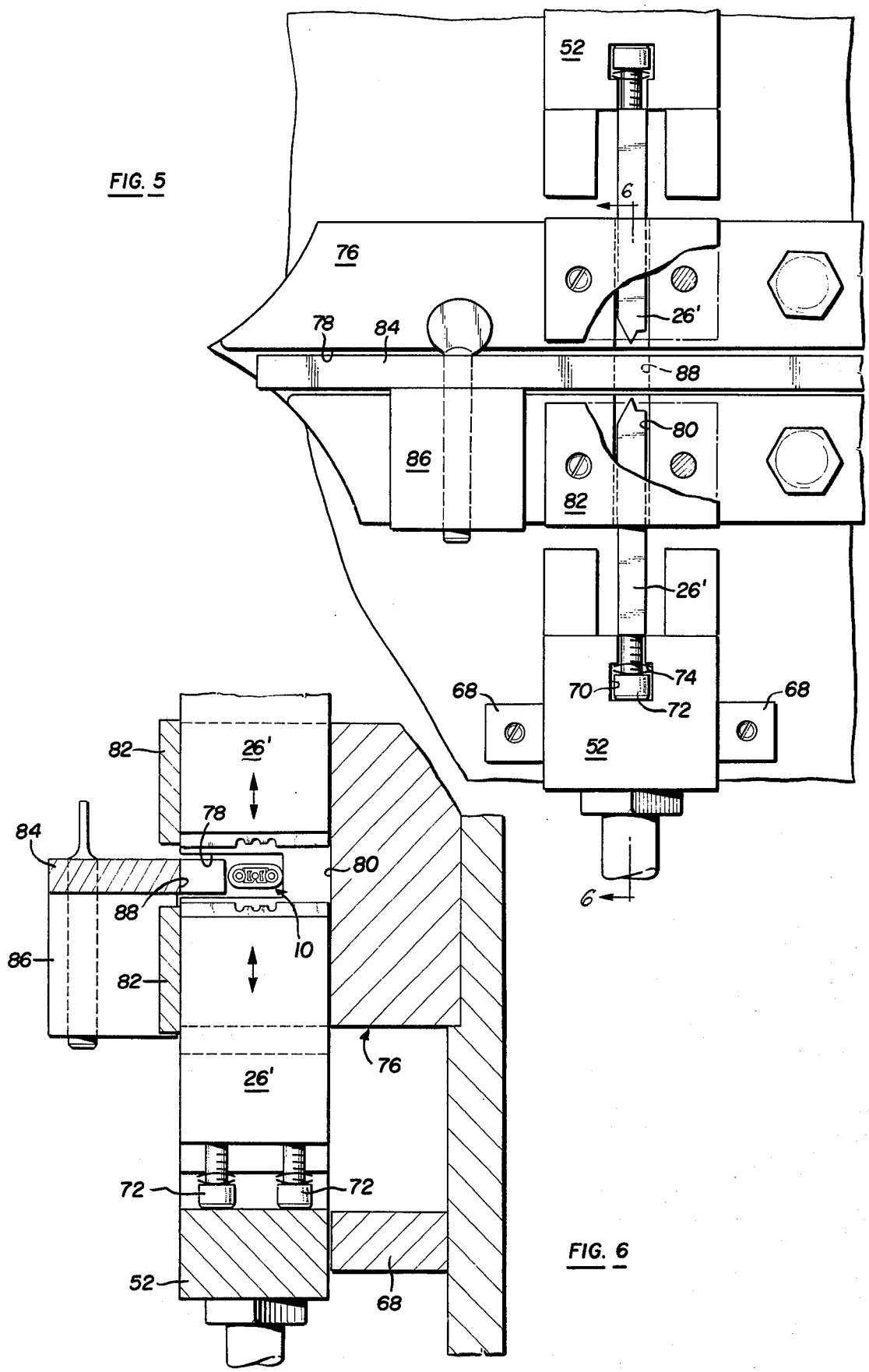

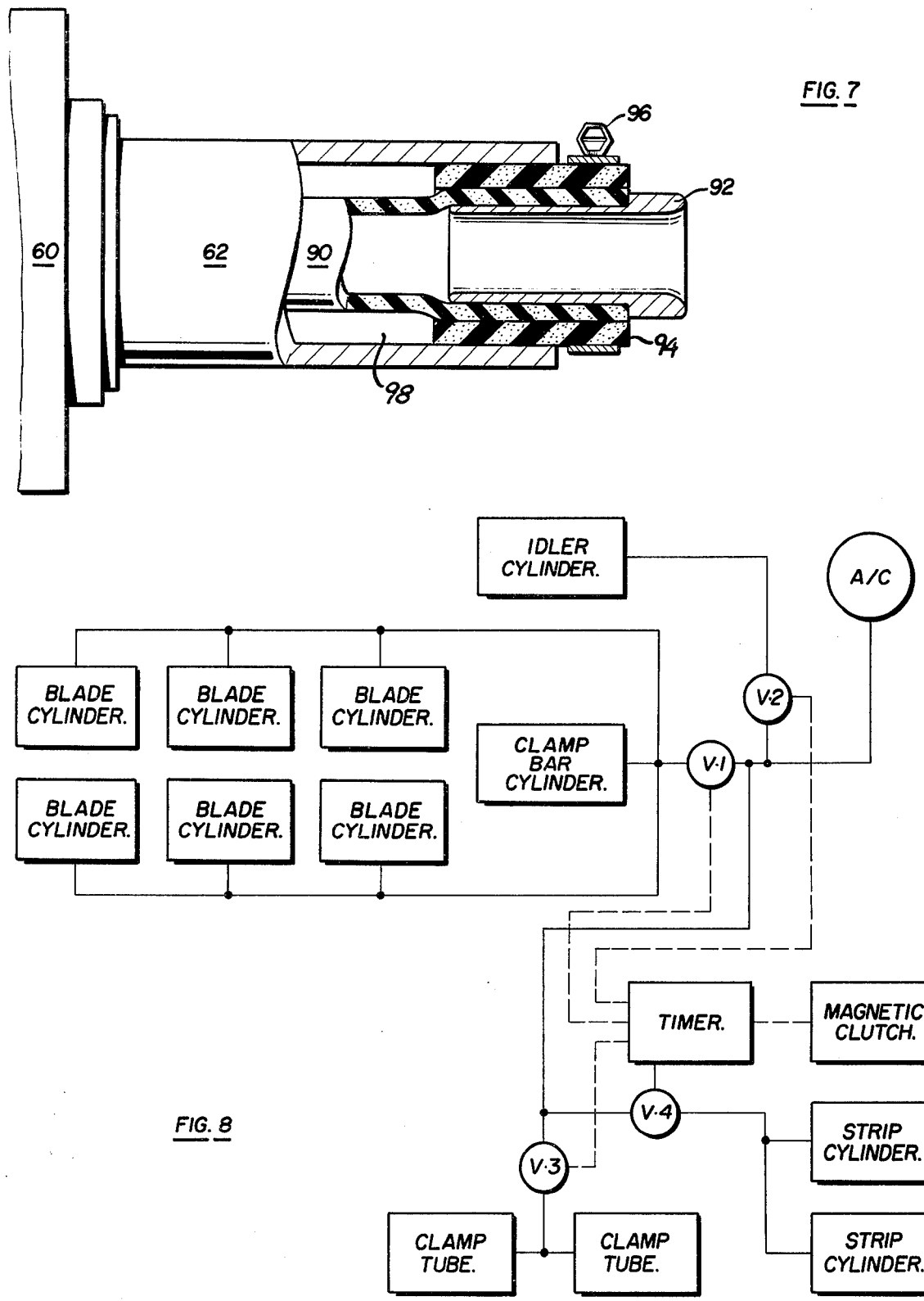

WIRE STRIPPING METHOD AND DEVICE

BACKGROUND OF INVENTION

This invention is concerned with simplifying the installation of conventional three-wire jacketed cable, such as is typically used in residential construction, and is further concerned with substantially eliminating costly scrap losses.

Three-wire cable typically comprises three side-by-side spaced lengths of No. 12 or No. 14 wire, the outer two hot wires being individually insulated and the central ground wire being spaced from the two hot wires by layers of paper or similar insulation. This entire assembly is then covered with a heavy insulating jacket by means of an extrusion process.

When installing such cable in the residence, for example, the electrician has several operations to perform in preparing each end of the cable for connection. First, he must strip off the outer jacket for a length about 5 inches back from the end. This is necessary in order to permit the three individual wires to be separated for their respective connections within a junction box, while maintaining the jacket intact for the full length of the cable between the outlet boxes. In removing the end portions of the jacket, the electrician must take care that in cutting through the jacket he does not create any potential short-circuit hazard by also nicking or cutting through the individual insulations. Furthermore, considerable force is required to break loose and strip the severed jacket from the interior insulations, because of the inevitable snug fit and partial bonding which occurs between the jacket and the insulations during the jacket-extrusion process.

After removing the five inch length of jacket from each end of the cable, the electrician must strip off about half an inch of insulation from the ends of the two insulated hot wires.

Thus, even after the cable has been cut to length, the electrician must perform several steps before he is ready is complete the connection, these steps requiring the expenditure of time, effort and considerable care.

Another factor which significantly contributes to the economics of the wiring phase of construction is the cable scrap rate. The cable is packaged on a long reel. The electrician does not know the exact length of cable that he needs to make his connection from one junction box to another. These lengths, which frequently are in the range of 10 to 15 feet, are typically estimated by the electrician, who then unreels the approximate estimated length and cuts the cable. Naturally, to be sure that he has enough cable, the electrician will generally estimate liberally, resulting in the creation of excess length which becomes scrap when the electrician has completed the connection at the first end of the cable, threaded the cable to the second junction box and cut it to the precise length prior to making the connection within such box.

Accumulation of scrap becomes extremely costly. A very conservative estimation of the annual cost of this scrap for the assignee of the present invention, a mobile home manufacturer, was computed as follows: With one foot of scrap per cable length, 50 cable lengths per mobile home, nine mobile homes manufactured per day in each of 32 plants, during a 208 day working year, at 5 cents per foot of cable, results in a scrap cost of $149,000 per year. This material cost is, of course, to be added to the labor cost created by the time required to prepare each end of the cable for connection, as described above.

Accordingly, it is the principal object of the present invention to provide a system for substantially reducing the cost of the preparation and installation of three-wire cable, by automatically cutting the cable to predetermined lengths and stripping the jacket and insulation at the cable ends.

BRIEF DESCRIPTION OF THE DRAWINGS

FIG. 1A is a perspective view of a cable end after it has been treated by the method and apparatus of the present invention, further showing the three different cutting blade configurations involved.

FIG. 1B is a perspective view of the end of the cable of FIG. 1A, after the severed jacket portion has been completely removed.

FIG. 2 is a longitudinal cross-sectional view of a cable end after completion of the cutting operations, in accordance with the present invention.

FIG. 3 is a view similar to FIG. 2, but showing the position of the cable elements after the jacket has been partially stripped from the individual wires.

FIG. 5 is an enlarged fragmentary view, similar to FIG. 4 showing the details of the cable guide and cutter construction.

FIG. 6 is a cross-sectional view in the direction of arrows 6—6 of FIG. 5.

FIG. 7 is an enlarged fragmentary view, partly in section, of the cable gripping and indexing means of FIG. 4.

FIG. 8 is a schematic diagram showing the controls for the operating elements of the system illustrated in FIG. 4.

DETAILED DESCRIPTION OF THE INVENTION

Figure 4:
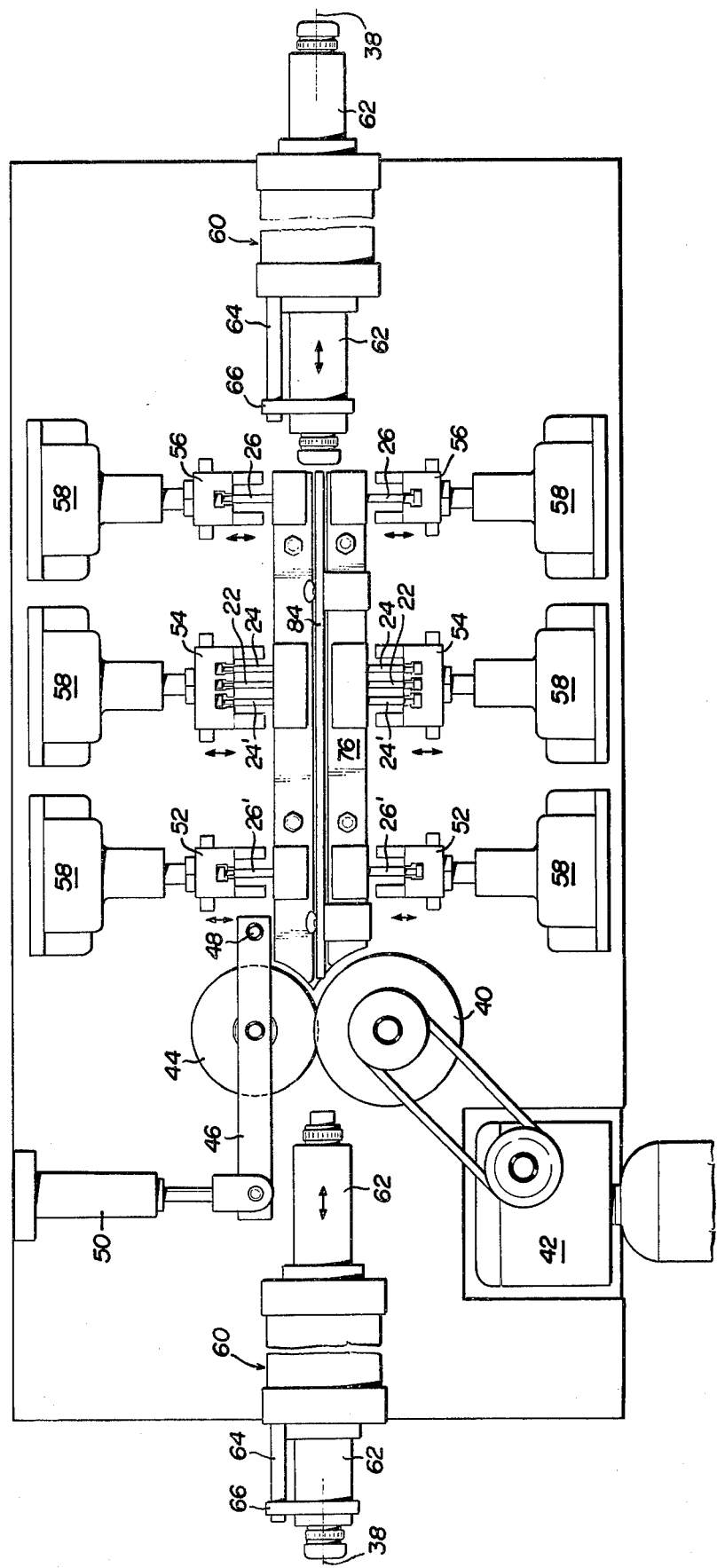
FIG. 4 is an elevational view of the cable feeding, cutting, and stripping apparatus of the present invention.

Referring to FIGS. 1–3 of the drawings, there is illustrated one end of a conventional three-wire cable 10 such as is typically used in residential and other types of construction. Cable 10 comprises two outer hot wires 12 spaced and coplanar with a central ground wire 14. Each of the hot wires 12 has its own coating of insulation 16, while the central ground wire 14 is surrounded by paper or similar packing 18. This assembly is then completely surrounded by an outer insulating jacket or sheathing 20, which is typically applied by an extrusion process so as to completely and snugly enclose the assembly. It is to be understood, however, that the method and apparatus disclosed herein can be successfully employed on any type of multiple wire insulated and jacketed cable, wherein the wires are substantially coplanar.

It will be observed in FIGS. 1–3 that the three locations at which cutting operations are performed have been separately designated as "A, B and C".

The three different types of opposed cutting blade pairs required to perform the operations on the cable are shown in their appropriate positions along the cable length in FIG. 1A. For locations A, B and C, these blades are 22, 24 and 26, respectively. Blade 22 has a straight cutting edge 28, as required for completely severing the cable at location A. As will be more fully explained below, each blade operates in conjunction with an identical opposed blade, so that each blade comes only to the center line of the cable, at which point it theoretically meets its paired blade coming from the opposite direction.

Blade 24 is scalloped or relieved at three points 30 in order to clear the wires, these scallops being separated by short straight cutting edges 32, which completely sever the insulation between the wires. The portion of blade 24 projecting beyond the two hot wires 12 is relieved at 34, so as to leave a small portion 36 of jacket 20 unsevered at each side of the cable. Naturally, the main portion of the jacket must inevitably be severed by the blade as it passes downwardly during its insulation-cutting stroke. However, it is desirable to leave the jacket segment lying between points A and B connected with the portion of the jacket lying between points B and C, so the little A–B, jacket segment does not become a loose piece to foul the mechanism of the cutting and stripping device.

Cutting blade 26 also has three relieved or scalloped portions 35 separated by short straight cutting edges 36, but both cutting portions 35 and 36 are relieved relative to outer straight cutting edges 37. This configuration is essential because blade 26 must not cut either the wires or the individual insulation, though it must completely sever outer jacket 20. Therefore, outer edges 37 must come down all the way to the center line of the cable in order to sever the jacket. Blade 26 also has a stop ledge 39 which strikes outer jacket 20 at the completion of the normal cutting stroke and, if one blade has advanced farther than its opposite blade, will push the cable toward the trailing blade to assure an even cut on both sides of the cable. It thus prevents either blade from penetrating too far.

Referring now to FIG. 2 in particular, which illustrates the condition of the cable after the cutting operations have been performed, it will be readily seen from this typical longitudinal section through the length of one of the hot wires 12 that the wire is fully intact along its length all the way up to the point of cable severance A. The insulation 16 surrounding wire 12, however, is completely severed at point B only. The jacket 20 is completely severed at point "C", but only partially severed at point B as represented by the dotted line.

After the partial stripping of the jacket has been performed within the device, the cable end assumes the condition shown in FIG. 3, wherein jacket segments A–B and B–C, still connected to each other by portion 36 (FIG. 1A), have been longitudinally shifted relative to the remainder of the cable. Jacket segment A–B has carried with it the short severed segment of insulation 16 lying between points A and B, because of the slight bond that exists between insulation 16 and jacket 20 as a result of the original extrusion operation by which the jacket was applied.

Referring now to FIG. 4, the device which performs all of the operations of the novel method has a feed axis 38 along which the cable advances, which corresponds with the longitudinal axis of the cable while it is within the device. The cable is fed from left to right in FIG. 4 by means of a drive wheel 40 which is chain driven from a motor 42. In the cable-advancing or driving condition, the cable is gripped between drive wheel 40 and idler wheel 44, which is rotatably mounted on bracket 46 pivoted at 48 to swing along an arc under the influence of pneumatic cylinder 50. Thus, when the rod of cylinder 50 is in its downward extended position, the cable is gripped between the two wheels, whereas when the cylinder rod is in its upward withdrwn position, there is no gripping action on the cable. Idler wheel 44 is provided with a conventional one-way brake which prevents the wheel from rotating in the direction opposite to normal cable feed, thus preventing the cable from moving from right to left when cylinder 50 is extended.

It is to be understood that the cable driving mechanism just described is an optional feature of the present invention. The cutting and stripping operations could be performed by the same mechanism on a cable which was manually fed to the cutting area to be described below. However, the apparatus and method disclosed herein has the additional advantage of automatically feeding the cable and stopping it at the appropriate point so that it can be cut to predetermined lengths. This is accomplished by a punched-tape type of control or program operating in conjunction with a drive wheel revolution counter or other mechanism for indicating the peripheral travel of the drive wheel and cable. Such control mechanism can then be employed to engage or disengage a magnetic clutch, for example, controlling the transmission of power from the continuously driving motor 42 to the intermittently driving drive wheel 40. The time or control circuit and the magnetic clutch are schematically illustrated in FIG. 8. The punched-tape control portion of the device is the subject of my co-pending application, entitled "Punched Tape Reader", Ser. No. 477,753, filed June 10, 1974.

The cable cutting system comprises three pairs of opposed blade holding blocks 52, 54 and 56, all of such blocks being actuated by a series of blade actuating cylinders 58. Center block 54 holds three cutting blades, with the cable severing blade 22 being positioned between two identical insulation cutting blades 24, 24'. Each of the blade holding blocks 52 and 56 holds an identical jacket-severing blade 26, 26'.

From this arrangement of the blades it will be apparent that the cutting system is symmetrical about the centrally located cable severing blade 22. This is an important feature of this invention, in that it permits the trailing edge of one cable segment to be cut and stripped simultaneously with the leading edge of the next cable segment, both of these operations being performed simultaneously with the actual severing or cutting of the cable to length.

Located longitudinally beyond each of the outer blade holding blocks is a pneumatically-actuated stripping cylinder 60 having a hollow rod 62 whose longitudinal movement is guided with the aid of a guide rod 64 projecting from cylinder housing 60 and interconnected with cylinder rod 62 by means of bracket 66.

Referring now to FIGS. 5 and 6, blade holding block 52 is guided for vertical movement under the influence of cylinder 58 by means of a pair of nylon guides 68. Block 52 has a T-slot 70 which receives the head of blade adjusting screw 72 which is threaded into the end of the blade opposite to the cutting edge. By adjusting the degree of insertion of screw 72 into blade 26', the vertical position of the blade can be accurately adjusted to obtain the exact degree of penetration into the cable required. A Belleville washer 74 maintains the screw in its preset location.

The cable is guided through the device by means of an elongated cable guide housing 76 having a longitudinal slot 78 in which the cable slides during its passage through the device. Cable guide housing 76 also has a plurality of vertical blade slots 80 which receive each of the individual cutting blades. The blades are restrained for reciprocating movement within housing 76 by means of blade retainer plates 82. The foregoing structure is typical of the blade holding and guiding structure for each of the ten blades required in the device of FIG. 4.

The open side of the cable receiving slot 78 of housing 76 receives a cable clamping bar 84 whose function is to slide into or out of slot 78 (right or left in FIG. 6) depending upon whether the cable is to be clamped for cutting or whether the cable is to be left free to be longitudinally fed through the device by means of drive wheel 40. This motion of cable clamping bar 84 is controlled by a pneumatic cylinder, shown schematically in FIG. 8, which has its rod connected to a block 86 fixed to the lower side of clamping bar 84. Clamping bar 84 must also be provided with a series of vertical blade-receiving slots 88 to permit passage of the blades during their cutting strokes.

Referring now to FIGS. 4 and 7, the cable gripping structure associated with stripping cylinder 60 and cylinder rod 62 comprises a resilient radially collapsible length of rubber tubing 90 having a nylon end cap or guide insert 92 and surrounded by a compressible rubber collar 94 which is firmly clamped to the outside of tubing 90 by means of hose clamp 96. Rubber collar 94 is firmly bonded within the end portion of hollow cylinder rod 62, so that the whole structure is concentrically retained within the cylinder rod and so that an annular chamber 98 is defined between the outer diameter of tube 90 and the inner diameter of cylinder rod 62. The structure illustrated in FIG. 7 is typical of the construction at the opposite end of the cylinder rod, so that tube 90 passes entirely through the full length of the cylinder rod. A source of compressed air, shown schematically in FIG. 8, is connected through appropriate valving to annular chamber 98, to selectively pressurize or exhaust this chamber. When chamber 98 is pressurized, collapsible rubber tube 90 will collapse upon and firmly grip the portion of the cable contained therein, so that when the cylinder rod 62 is indexed toward the right, the gripped portion of cable 10 will also be indexed toward the right.

OPERATION

To initiate operation, the leading edge of the cable would be fed off the cable reel and into slot 78 of cable guide housing 76 until the end of the cable was aligned with cable severing blade 22. At that point, the severing and stripping operation would be performed on the leading edge of such cable, that is, the portion of the cable lying to the left of blade 22 as shown in FIG. 4. This being the initial operation on the new length of cable, there would be no cable lying to the right of blade 22. Nevertheless, the entire device would run through its cycle as if there were a cable in both portions of the device. Since the cutting and stripping function at this point would be identical to that which occurs after the subsequent indexing of this leading edge of the cable, such steps will be described in connection with the next or subsequent cutting and stripping steps.

After this initial cutting and stripping on the leading edge of the cable, the cable is indexed either manually or under the influence of the punch-tape control and magnetic clutch described above until the predetermined length from the leading edge had run through the device, whereupon the cable is either manually stopped or the magnetic clutch disengaged. The clamping cylinder then causes cable clamping bar 84 to advance into slot 78 to clamp the cable firmly in place, and blade actuating cylinders 58 extend to provide the cutting strokes of all ten blades simultaneously. The blade extending pressure is maintained in cylinders 58, so that the blades remain in their fully extended cable-penetrating positions. Cylinder 50 is retracted to release idler wheel 44 from cable engagement.

Next, the annular chambers 98 within the cable stripping cylinder rods 62 are pressurized, so that rubber tubing 90 grips the portions of the cable located outside or beyond each of the jacket-severing blades 26, 26'. With the cable portions thus gripped, both stripping cylinders are actuated, so that the right hand stripping cylinder 60 indexes toward the right, while left hand stripping cylinder 60 indexes toward the left, as viewed in FIG. 4. This is the action which causes the cable to assume the condition shown in FIGS. 1A and 3. The partial stripping of jacket segment A–C is made possible because the still-extended jacket-severing blades 26 and 26' prevent such jacket segments from following the indexing movement of the portions of the cable gripped within stripping cylinders 60, while the extended blades 24 and 24' prevent movement of insulation segments A–B. At the same time, the indexed portion of the cable is free to move, because there is no clamping or gripping force exerted on the indexed portion lying between points A and C of the cable.

When this indexing or partial stripping step has been completed, idler cylinder 50 is once again extended to bring idler wheel 54 back into engagement with the cable, the air pressure within annular chambers 98 of stripping cylinders 60 is exhausted, stripping cylinders 60 return to their original positions by moving longitudinally toward each other, blade actuating cylinders 58 are retracted to withdraw the cutting blades, clamping bar 84 is retracted and the device is ready for another cycle of feeding the cable a predetermined distance for the next cutting stroke. The next cycle can, for example, be initiated by the opertor pulling the severed cable length out of the device, thus triggering a microswitch to restart the cycle.

The above described method and apparatus simultaneously cuts the cable to length, strips the insulation and partially strips the surrounding jacket from both the trailing edge of the severed cable length and the leading edge of the next cable length still connected to the cable supply reel.

It is preferable that the stripping cylinders only index a sufficient distance to assure that the jacket is broken loose from the inner insulations 16 and 18, without completely removing the severed jacket lengths A–C from the cable. The reason for this preference is that in such condition, as shown in FIGS. 1a and 3, the severed, but only partially stripped jacket segment A–C protects the bare ends of the wire 12 during subsequent handling and also retains the three partially stripped individual wires in a tight cluster and prevents them from spreading apart. This is a convenience, because the cut-to-length cable must thereafter be threaded through numerous holes in the framing of the building and then ultimately into the junction box itself. The retention of the three individual wires in a tight bundle facilitates and speeds up this operation. However, it is to be understood that the selection of the length of stroke of stripping cylinder 60 can be readily accommodated to either partial or complete stripping of the severed jacket segment as desired. Of course, one additional advantage of leaving the partially stripped segment on the cable is that it does not become a loose piece within the device, where it might possibly cause jamming or interference with normal operation.

Thus, the present invention accomplishes the objectives set forth above. A particularly advantageous application of this invention is for production type construction wherein numerous identical structures are to be wired, such as apartments, condominiums, factory built homes, or mobile homes. For such use, each individual length of cable required can be precisely measured and preprogrammed into the feed control portion of the device. When the device is put into operation, it can automatically and continuously run off a complete set of precut, prestripped cables for the full structure.

This invention may be further developed within the scope of the following claims. Accordingly, the above specification is to be interpreted as illustrative of only a single operative embodiment of this invention, rather than in a strictly limited sense.

I now claim:

1. A method for cutting to length and preparing for use a jacketed cable consisting of a plurality of wires arranged in parallel but spaced and planar relationship within the cable, at least some of said wires being individually insulated prior to being encased within the jacket, comprising the steps of:
   1. feeding cable to be cut into the cutting device and positioning it relative to a plurality of cutting blades to prepare the cable for cutting to a predetermined length;
   2. completely severing the cable at a first point along its length;
   3. severing only the jacket at secoond and third points along the cable, said second and third points being located at opposite sides of said first point and spaced a short distance therefrom;
   4. severing all of the individual insulation without cutting the wires and while only partially severing the jacket at fourth and fifth points along the cable, said fourth and fifth points being located on opposite sides of said first point and between said first point and said second and third points, respectively;
   5. said severing steps (2) through (4) being performed simultaneously while the cable is held in a fixed position;
   6. maintaining the cutting blades at the second and third points in an extended position at least partially penetrating the jacket to thereby prevent longitudinal movement of the severed jacket segments therebetween;
   7. gripping the cable at the sides of the second and third points remote from the first point;
   8. longitudinally indexing both gripped cable segments in opposite directions away from the first point while holding in place the severed jacketed segments between said first and second points and between said first and third points, to thereby loosen said jacket segments from the unsevered insulation within.

2. A method for cutting to length and preparing for use a jacketed cable consisting of a plurality of wires arranged in parallel but spaced and planar relationship within the cable, at least some of said wires being individually insulated prior to being encased within the jacket, comprising the steps of:
   1. feeding cable to be cut into the cutting device and positioning it relative to a plurality of cutting blades to prepare the cable for cutting to a predetermined length;
   2. completely severing the cable at a first point along its length;
   3. severing only the jacket at second and third points along the cable, said second and third points being located at opposite sides of said first point and spaced a short distance therefrom;
   4. severing all of the individual insulation without cutting the wires at fourth and fifth points along the cable, said fourth and fifth points being located on opposite sides of said first point and between said first point and said second and third points, respectively;
   5. gripping the cable at the sides of the second and third points remote from the first point;
   6. longitudinally indexing both gripped cable segments in opposite directions away from the first point while holding in place the severed jacketed segments between said first and second points and between said first and third points, to thereby loosen said jacket segments from the unsevered insulation within.

3. A method for stripping only the outer jacket from the end portion of a jacketed cable of the type containing a plurality of wires, at least some of which are individually insulated prior to being encased within the outer jacket, comprising the steps of:
   1. severing the jacket, without cutting the inner insulation or wires, at a point near a first end of the cable;
   2. enclosing within a radially collapsible tube a portion of the cable lying on the opposite side of said severence point from said first end;
   3. applying fluid pressure to the exterior wall of said tube to cause said tube to radially collapse upon and firmly grip said enclosed portion of the cable;
   4. restraining against longitudinal movement the severed segment of the jacket lying between said severence point and said first end;
   5. longitudinally indexing said collapsed tube and the cable portion therein in a direction away from said restrained jacket segment, to thereby cause the unsevered insulated wires within said severed jacket segment to slide longitudinally at least partially out from within said severed jacket segment.

4. A method for stripping only the outer jacket from the end portion of a jacketed cable of the type containing a plurality of wires, at least some of which are individually insulated prior to being encased within the outer jacket, comprising the steps of:
   1. severing the jacket, without cutting the inner insulation or wires, at a point near a first end of the cable by means of cutting means which travel inwardly toward the cable during its cutting stroke;
   2. enclosing within a radially collapsible tube a portion of the cable lying on the opposite side of said severence point from said first end;
   3. applying fluid pressure to the exterior wall of said tube to cause said tube to radially collapse upon and firmly grip said enclosed portion of the cable;
   4. restraining against longitudinal movement the severed segment of the jacket lying between said severence point and said first end by maintaining said cutting means in a jacket-penetrating position to thereby block longitudinal movement of said severed jacket segment toward said severence point;

5. longitudinally indexing said collapsed tube and the cable portion therein in a direction away from said restrained jacket segment, to thereby cause the unsevered insulated wires within said severed jacket segment to slide longitudinally at least partially out from within said severed jacket segment.

5. A device for cutting to length and preparing for use a jacketed cable consisting of a plurality of wires arranged in parallel but spaced and planar relationship within the cable, at least some of said wires being individually insulated prior to being encased within the jacket, comprising:

1. drive means for selectively and longitudinally feeding the cable into and through the device;
2. guide means for guiding the cable in a predetermined path within the device;
3. first cutter means for completely severing the cable at a predetermined point along its length;
4. second and third cutter means located on opposite sides of said first cutter means, each of said second and third cutter means including cutting blade means configured to sever only the cable jacket at second and third points along its length, without cutting either the wires or the insulation at such points;
5. fourth and fifth cutter means located on opposite sides of said first cutter means and between said first cutter means and said second cutter means and between said first cutter means and said third cutter means, respectively, each of said fourth and fifth cutter means including cutter blade means configured to sever the insulation associated with each individual wire while only partially severing the jacket at fourth and fifth points along the length of the cable, without cutting the wires at such points;
6. cutter control means for controlling the cutting and retracting strokes of said first, second, third, fourth and fifth cutter means, respectively;
7. said first, second, third, fourth and fifth cutting operations being performed substantially simultaneously while the cable is retained in a single position within the device;
8. first and second cable gripping means located on the sides of said second and third cutting means opposite from said first cutting means, respectively, for selectively firmly gripping the cable portions at such opposite sides;
9. gripper indexing means operatively connected with said first and second cable gripping means to cause them to selectively index toward and away from said first cutter means;
10. and jacket retaining means operative to selectively engage the severed jacket segments lying between said first point and each of said second and third points and to prevent longitudinal movement of said segments away from said first cutter means during the indexing of said gripped cable portions away from said first cutter means by said gripper indexing means.

6. The device of claim 5 wherein said first and second cable gripping means each comprise:

1. a radially collapsible tube adapted to coaxially receive and surround the portion of the cable to be selectively gripped;
2. tube-enclosing means for surrounding a portion of the length of said tube intermediate its ends; said tube enclosing means creating a fluid-tight annular chamber around said tube portion while leaving the ends of said tube exposed for passage of the cable therethrough;
3. a source of fluid pressure connected to said chamber;
4. and gripping means control means for selectively applying fluid pressure to said chamber to cause said tube to collapse upon and firmly grip the enclosed portion of the cable.

7. The device of claim 6 wherein each of said gripper indexing means comprises a hollow piston rod of a fluid motor, said hollow rod being fixed to said cable gripping means for longitudinal movement therewith, and said hollow piston rod also serving as said tube enclosing means.

8. A device for cutting to length and preparing for use a jacketed cable consisting of a plurality of wires arranged in parallel but spaced and planar relationship within the cable, at least some of said wires being individually insulated prior to being encased within the jacket, comprising:

1. first cutter means for completely severing the cable at a predetermined point along its length;
2. second and third cutter means located on opposite sides of said first cutter means, each of said second and third cutter means including cutting blade means configured to sever only the cable jacket at second and third points along its length, without cutting either the wires or the insulation at such points;
3. fourth and fifth cutter means located on opposite sides of said first cutter means and between said first cutter means and said second cutter means and between said first cutter means and said third cutter means, respectively, each of said fourth and fifth cutter means including cutter blade means configured to sever the insulation associated with each individual wire at fourth and fifth points along the length of the cable, without cutting the wires at such points;
4. cutter control means for controlling the cutter and retracting strokes of said first, second, third, fourth and fifth cutter means, respectively.

9. The device of claim 8 whee each of said second, third, fourth and fifth cutter means comprises a pair of opposed aligned cutting blades mounted for travel toward and away from each other along a line perpendicular to the plane of the wires during their cutting and retraction strokes.

10. The device of claim 8 wherein said first, second, third, fourth and fifth cutting operations are performed substantially simultaneously while the cable is retained in a single position within the device.

11. The device of claim 8 which further comprises:

1. first and second cable gripping means located on the sides of said second and third cutting means opposite from said first cutting means, respectively, for selectively firmly gripping the cable portions at such opposite sides;
2. gripper indexing means operatively connected with said first and second cable gripping means to cause them to selectively index toward and away from said first cutter means;

3. and jacket retaining means operative to selectively engage the severed jacket segments lying between said first point and each of said second and third points and to prevent longitudinal movement of said segments away from said first cutter means during the indexing of said gripped cable portions away from said first cutter means by said gripper indexing means.

12. The device of claim 11 which further comprises:
1. a radially collapsible tube adapted to coaxially receive and surround the portion of the cable to be selectively gripped;
2. tube-enclosing means for surrounding a portion of the length of said tube intermediate its ends, said tube enclosing means creating a fluid-tight annular chamber around said tube portion while leaving the ends of said tube exposed for passage of the cable therethrough;
3. a source of fluid pressure connected to said chamber;
4. and gripping means control means for selectively applying fluid pressure to said chamber to cause said tube to collapse upon and firmly grip the enclosed portion of the cable.

13. The device of claim 12 wherein each of said gripper indexing means comprises a hollow piston rod of a fluid motor, said hollow rod being fixed to said cable gripping means for longitudinal movement therewith, and said hollow piston rod also serving as said tube enclosing means.

14. A device for stripping only the outer jacket from the end portion of a jacketed cable of the type containing a plurality of wires, at least some of which are individually insulated prior to being encased within the outer jacket, and wherein the jacket only has previously been severed at a point spaced from the end of a cable, comprising:
cable gripping means including a radially collapsible tube adapted to coaxially receive and surround a portion of the cable to be selectively gripped;
tube-enclosing means for surrounding a portion of the length of said tube intermediate its ends, said tube enclosing means creating a fluid-tight annular chamber around said tube portion while leaving the ends of said tubes exposed for passage of the cable therethrough;
a source of fluid pressure connected to said chambers;
gripping means control means for selectively applying pressure to said chamber to cause said tube to collapse upon and firmly grip the enclosed portion of the cable;
jacket retaining means operable to engage the severed jacket segment which is to be stripped and to prevent longitudinal movement of said segment during stripping;
and gripper indexing means operable to index said cable gripping means longitudinally away from the jacket retaining means.

15. The device of claim 14, wherein said gripper indexing means comprises a hollow piston rod of a fluid motor, said hollow rod being fixed to said cable gripping means for longitudinal movement therewith and said hollow piston rod also serving as said tube enclosing means.

* * * * *